Dec. 11, 1951      C. SEKELY      2,578,606
GRASS SHEARS
Original Filed Jan. 21, 1948
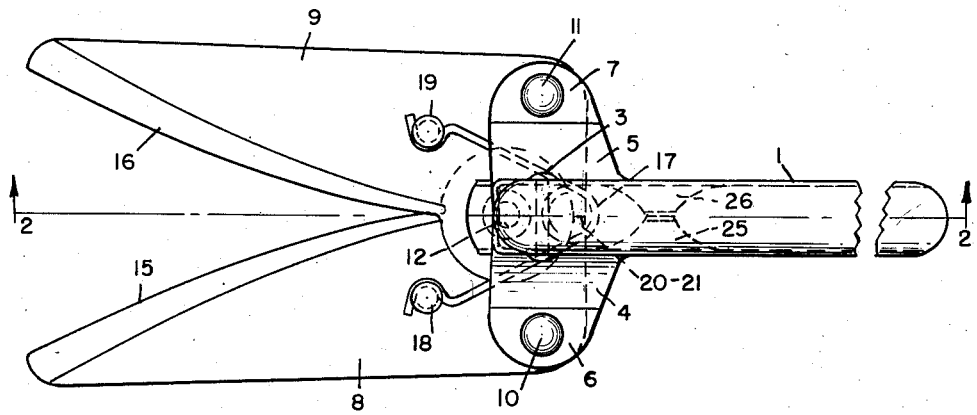
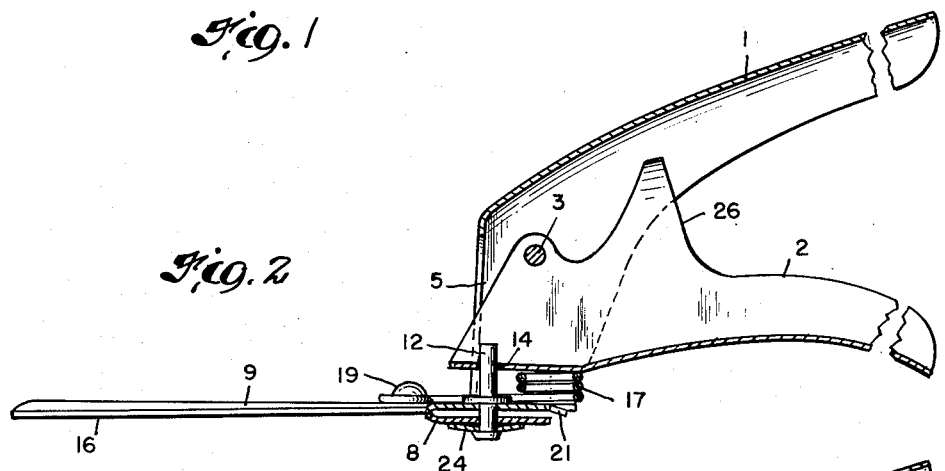
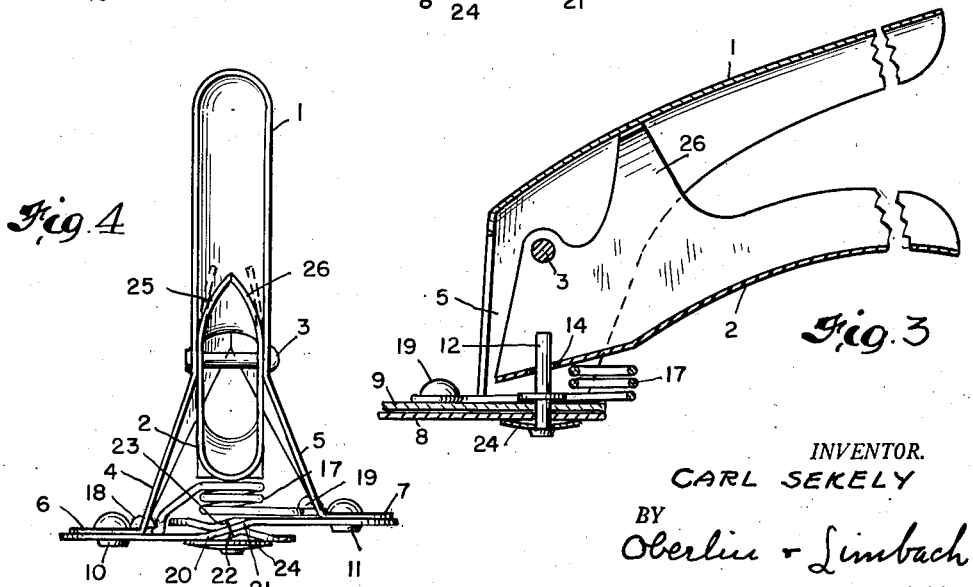
INVENTOR.
CARL SEKELY
BY
Oberlin + Limbach
ATTORNEYS.

Patented Dec. 11, 1951

2,578,606

UNITED STATES PATENT OFFICE 2,578,606

GRASS SHEARS

Carl Sekely, Salem, Ohio

Original application January 21, 1948, Serial No. 3,534. Divided and this application March 10, 1949, Serial No. 80,731

2 Claims. (Cl. 30—271)

1

The present invention relates generally as indicated to grass shears and more particularly to certain improvements in hand type shears of the type comprising co-acting pivoted blades and actuating handles for said blades lying in a plane perpendicular to the plane of the blades. The present application is a division of my co-pending application Serial No. 3,534, filed January 21, 1948.

Hitherto, shears of the type referred to as well as other types of shears have been provided with handle stop or bumper mechanisms so disposed that the operator's hand is likely to be pinched during normal use of the shears or so constructed as to include rubber elements and metal carriers therefor mounted on one or both of the actuating handles. In some shears no provision is made for adjustment of the stop means except by sawing or filing away of the metal thereof and even if provision is made for adjustment there is involved the additional expense of screws and the like and the formation of holes or slots in the stop members and handles.

In contradistinction to the above, it is herein proposed to provide a unique handle stop mechanism of elemental form not requiring any extra parts nor difficult and expensive forming operations.

It is a further object of this invention to provide a stop mechanism which in addition is yieldable and may be readily and quickly adjusted to accommodate wearing or distortion of the various components of the shears.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a top plan view of a grass shears embodying the present improvements;

Fig. 2 is a cross-section view taken substantially along the line 2—2, Fig. 1;

Fig. 3 is a fragmentary cross-section view of the shears in a closed position with the mechanism constituting the present invention operative to arrest closing movement of the blade actuating handles; and Fig. 4 is a rear elevation view illustrating in dotted lines either the initial form of the stop mechanism or an alternative arrangement providing for additional yielding.

The grass shears with which the handle stop or bumper mechanism constituting the present invention is associated comprises a pair of rearwardly extending handles 1 and 2 pivotally connected together at their front ends as by a headed pin 3 which extends through each of said handles. Said handles are preferably formed as by stamping and drawing operations from relatively light gauge sheet metal and are of generally U-shaped transverse cross-section as shown to strengthen the same and to provide smooth hand grips.

The upper handle 1 is provided with downwardly extending legs 4 and 5 terminating in outwardly extending feet 6 and 7 to which feet a pair of co-acting cutting blades 8 and 9 are pivotally connected as by the rivets 10 and 11, said blades being further pivotally connected to each other about a vertically disposed post 12 located midway between the rivets 10 and 11 and preferably forwardly of said rivets and of the handle pivot 3. The upper end of said post 12 extends loosely through an aperture 14 in the lower handle 2 to permit relative movement of the handles between the positions illustrated in Figs. 2 and 3.

From the foregoing it is apparent that by squeezing the handles 1 and 2 together and thus drawing the post 12 rearwardly relative to the rivets 10 and 11 and pin 3 as shown in Fig. 3 the blades 8 and 9 will thereby be caused to swing about said rivets with the co-acting cutting edges 15 and 16 of said blades progressively crossing over one another during the squeezing together of the handles.

Upon release of the handles, the torsion spring 17 which has its legs hooked over the rivets 18 and 19 on said blades is operative to open the blades and to restore the shares to the position shown in Figs. 1 and 2. The opening movement is arrested by the interengagement of the stop shoulders 20 and 21 which are formed at the rear ends of the blades 8 and 9.

The shears just described are well known in the art and the aforesaid application of which this application is a division discloses certain improvements in the cutting edges 15 and 16, in the cooperating cams 22 and 23 on the rear ends of the blades which are operative to continuously maintain the edges 15 and 16 in engagement during crossing over thereof, and in the spring washer 24 on the post 12 which yieldably urges the blades together and has a stabilizing effect for maintaining the blades in generally parallel planes. Inasmuch as the present application is not concerned with these improvements, further detailed discussion thereof is not deemed necessary.

As previously indicated, the present invention is concerned with a novel form of handle stop mechanism which is so disposed within one of the handles 1 and 2, herein the upper handle 1, as to preclude the possibility of the operator pinching his hand while using the shears. In the illustrated embodiment the lower handle 2 is integrally formed with a pair of upward projections 25 and 26 which preferably are curved transversely toward each other as shown and are adapted to engage within the underside of the upper handle 1 as shown in Fig. 3 when the handles are squeezed together.

In the event that the tips of the blades 8 and 9 do not come together or do not fully cross over each other when the handles are squeezed to the limit provided by the engagement of the projections 25 and 26 with the upper handle 1 it is possible to effect adjustment of the stop mechanism merely by applying further tight squeezing pressure on the handles either by hand or in a vise to cause transverse deformation or buckling of said projections. In this way the stop mechanism can be conveniently and quickly adjusted without manipulating adjusting screws or the like or without requiring sawing or filing of a rigid stop pin usually provided at the rear end of one or both of the handles of some grass shears.

If desired, the projections 25 and 26 may be formed as shown in dotted lines in Fig. 4 whereby upon engagement of the upper or free ends of the projections with the upper handle 1 there will be a camming action of the projections toward each other by reason of the inclination of the underside of the upper handle 1 relative to the path of relative movement of the handles. This provides for additional yielding and, of course, if, after the upper ends of the projections 25 and 26 come together, the blades 8 and 9 do not completely cross over, then the adjustment which causes buckling of the projections can be effected in the manner described above.

Inasmuch as the projections 25 and 26 are disposed within the sides of the upper handle 1 there is no opportunity for pinching the hand of the user. Moreover, the handle stop mechanism is of simple form and is economical to manufacture in that expensive tooling, threading, riveting, etc. is not required for mounting the stop mechanism on the shears. In addition, when the projections 25 and 26 are formed so that the upper ends are spaced apart as in Fig. 4 there is provided a yieldable stop or bumper which does not require the usual rubber element and carrier therefor. In any event, there is a transverse deformation or buckling of the projections which affords a simple adjustment upon application of a squeezing pressure on the handles considerably greater than applied during the normal use of the shears.

Other modes of applying the principle of the invention may be employed, change being made as regards the details described, provided the features stated in any of the following claims, or the equivalent of such, be employed.

I therefore particularly point out and distinctly claim as my invention:

1. In a shears, a pair of pivoted blades formed with co-acting cutting edges; a pair of blade actuating pivoted handles of U-shaped transverse cross section; a pair of projecting deformable stops, spaced apart and formed integrally on one of said handles to extend into the U-shaped depression of the other of said handles and disposed to be urged together and deformed transversely to the plane of the handles when said handles are squeezed together, said other handle straddling said stops so that the hand of the user is protected from pinching, said stops engaging each other upon predetermined squeezing together of said handles, adjustment of the relative positions of said handles when said stops engage as aforesaid being provided by continued squeezing of the handles to buckle and thus cause a permanent set in said stops.

2. In a shears, a pair of pivoted blades formed with co-acting cutting edges; a pair of blade actuating pivoted handles of U-shaped transverse cross-section presenting opposed concave surfaces; a projecting deformable stop, formed integrally on one of said handles and extending into the opposite concave portion of the other of said handles, said stop engaging the concave surface of said other handle when said handles are squeezed together, said other handle straddling such projection so that the hand of the user is protected from pinching, the relative positions of said handles when said stop engages the concave surface of said other handle being varied by continued squeezing of said handles to buckle and thus cause a permanent set in said stop.

CARL SEKELY.

REFERENCES CITED

The following references are of record in the file of this patent:

UNITED STATES PATENTS

| Number | Name | Date |
|---|---|---|
| 1,618,817 | Dooley | Feb. 22, 1927 |
| 1,822,591 | Hickok | Sept. 8, 1931 |
| 2,373,757 | Hart | Apr. 17, 1945 |

FOREIGN PATENTS

| Number | Country | Date |
|---|---|---|
| 686,384 | France | July 25, 1930 |
| 724,298 | France | Apr. 25, 1932 |